US009462089B1

United States Patent
Fallows

(10) Patent No.: US 9,462,089 B1
(45) Date of Patent: Oct. 4, 2016

(54) COMMUNICATION CHANNELS

(71) Applicant: Kaazing Corporation, San Jose, CA (US)

(72) Inventor: John R. Fallows, Palo Alto, CA (US)

(73) Assignee: Kaazing Corporation, San Jose, CA (US)

( * ) Notice: Subject to any disclaimer, the term of this patent is extended or adjusted under 35 U.S.C. 154(b) by 146 days.

(21) Appl. No.: 14/212,963

(22) Filed: Mar. 14, 2014

Related U.S. Application Data

(60) Provisional application No. 61/791,644, filed on Mar. 15, 2013.

(51) Int. Cl.
*H04L 29/06* (2006.01)
*H04L 12/28* (2006.01)
*H04L 12/801* (2013.01)

(52) U.S. Cl.
CPC ........... *H04L 69/22* (2013.01); *H04L 12/2836* (2013.01); *H04L 29/06* (2013.01); *H04L 69/08* (2013.01); *H04L 47/10* (2013.01)

(58) Field of Classification Search
None
See application file for complete search history.

(56) References Cited

U.S. PATENT DOCUMENTS

| | | | | |
|---|---|---|---|---|
| 2002/0003813 A1* | 1/2002 | Marko | .................. | H03M 13/23 370/477 |
| 2002/0101934 A1* | 8/2002 | Kenney | ................. | H04L 1/0041 375/267 |
| 2012/0014475 A1* | 1/2012 | Wu | ...................... | H04B 7/0413 375/296 |
| 2013/0070745 A1* | 3/2013 | Nixon | ..................... | H04L 45/74 370/338 |
| 2014/0143298 A1* | 5/2014 | Klotzer | ............... | H04L 67/2823 709/203 |
| 2014/0143299 A1* | 5/2014 | Klotzer | ................. | G06F 19/321 709/203 |
| 2014/0181179 A1* | 6/2014 | Clark | .................... | H04L 65/608 709/203 |
| 2014/0222890 A1* | 8/2014 | Zhu | ..................... | H04L 65/1033 709/203 |
| 2014/0240753 A1* | 8/2014 | Anno | .................... | G06F 3/1236 358/1.15 |
| 2014/0376444 A1* | 12/2014 | Park | ........................ | H04W 4/06 370/312 |

\* cited by examiner

*Primary Examiner* — Ayaz Sheikh
*Assistant Examiner* — Mariela Vidal Carpio
(74) *Attorney, Agent, or Firm* — Van Pelt, Yi & James LLP

(57) ABSTRACT

Labeling data is disclosed. Data to be communicated using a first communication protocol is received. For each of a plurality of portions of the received data, a data grouping is identified among a plurality of data groupings of a network connection. A second communication protocol is used to label identified portions of the received data encoded in the first communication protocol with a corresponding data grouping identifier. The labeled identified portions of the data are provided via the network connection.

20 Claims, 8 Drawing Sheets

702 — GET /transport HTTP/1.1\r\n
704 — Upgrade: websocket\r\n
706 — ...
Sec-WebSocket-Extension: x-kaazing-channels;extensions=x|y|z
...

708 — HTTP/1.1 101 Switching Protocols\r\n
710 — Upgrade: websocket\r\n
712 — ...
Sec-WebSocket-Extension: x-kaazing-channels;extension=x|y
...

714 — 0x0000 CONNECT
716 — 0x0000 CONNECTED
718 — 0x0000 SUBSCRIBE w/ subscription-id, receipt-id
720 — 0x0000 RECEIPT w/ receipt-id
722 — 0xffff channel 0002 created with extension y
724 — 0x0002 MESSAGE w/ id, subscription-id (optional)
726 — 0x0000 ACK w/ id, receipt-id
728 — 0x0000 RECEIPT w/ receipt-id
730 — 0x0000 UNSUBSCRIBE w/ subscription-id
732 — 0x0000 RECEIPT w/ receipt-id
734 — 0xffff channel 0002 destroyed

FIG. 7

COMMUNICATION CHANNELS

CROSS REFERENCE TO OTHER APPLICATIONS

This application claims priority to U.S. Provisional Patent Application No. 61/791,644 entitled WEBSOCKET FANOUT filed Mar. 15, 2013 which is incorporated herein by reference for all purposes.

BACKGROUND OF THE INVENTION

Some of the most effective types of network data flow optimizations between network endpoints require application level insight into the data flow. These types of data flow optimizations may be achieved using optimizations specific to the application level communication protocol being utilized for the data flow. However, a generalized solution that is applicable to multiple types of application level protocols is often preferable. One possible generic solution is to map various application level protocols to a common protocol that is be utilized to implement optimizations. However, translation to the common protocol often results in a loss of information encoded in the original protocol that may be desirable to retain. Therefore, there exists a need for an improved generalizable network data flow optimization solution.

BRIEF DESCRIPTION OF THE DRAWINGS

Various embodiments of the invention are disclosed in the following detailed description and the accompanying drawings.

FIG. 7 is an example communication exchange between two WebSocket communication parties using multiple communication channels of a WebSocket connection.

DETAILED DESCRIPTION

Figure 1:
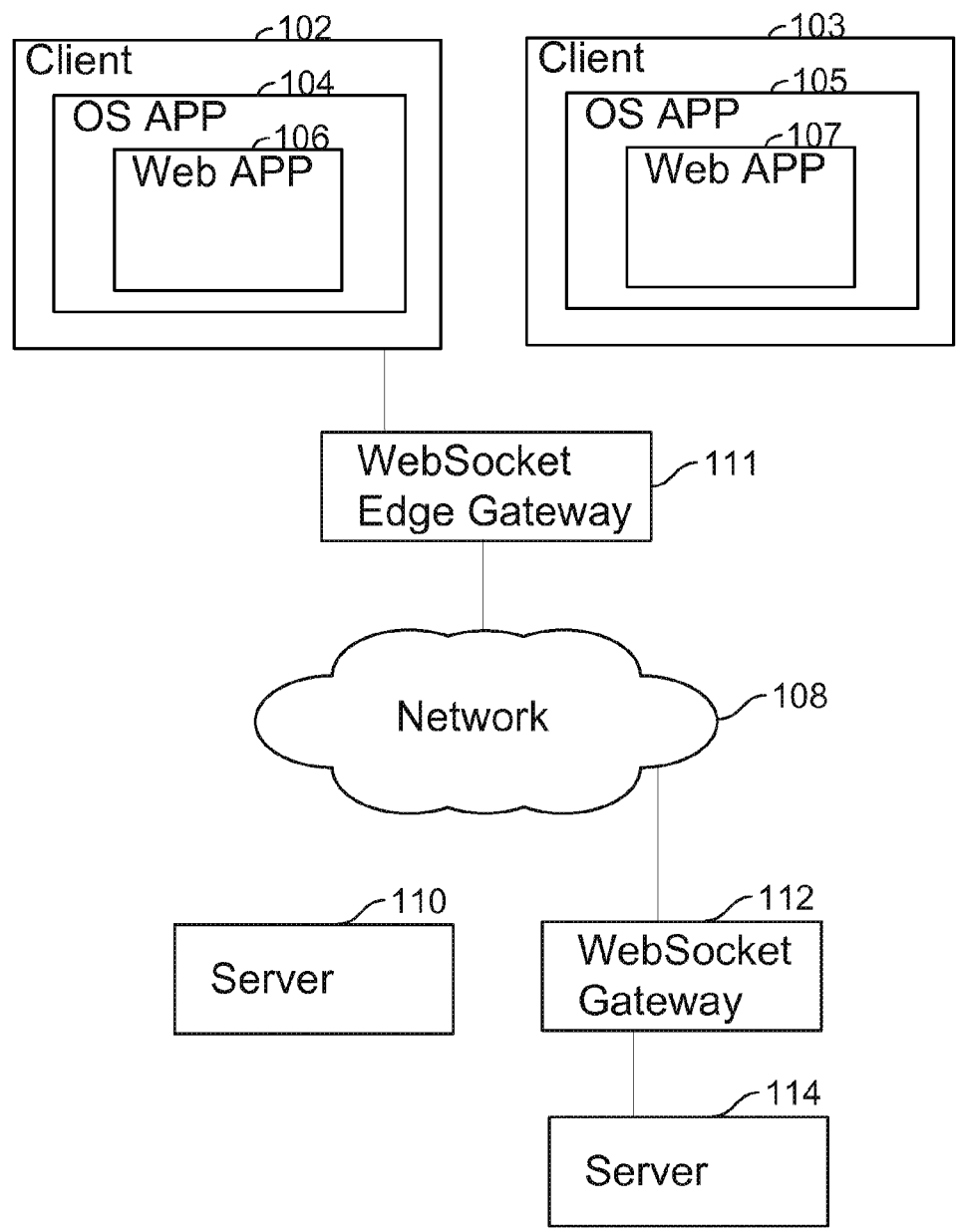
FIG. 1 is a diagram illustrating an example WebSocket communication environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Labeling content of a network connection is disclosed. In some embodiments, data to be communicated using a first communication protocol is received. For example, data to be encoded and communicated using an application level protocol is received. For each of one or more portions of the received data, a data grouping is identified. For example, a network connection (e.g., WebSocket protocol connection) has been configured to transport a plurality of logical communication channels and each portion of the received data is identified as belonging to one of the plurality of communication channels. This may allow separation and grouping of portions of the communicated data to allow optimizations to be applied to a specific identified portion of the data to be communicated. A second communication protocol is utilized to label portions of the received data encoded in the first communication protocol with a corresponding data grouping identifier. For example, the second communication protocol is the WebSocket protocol and portions of the received data encoded in the first communication protocol are enveloped in WebSocket messages that are each labeled as belonging to a corresponding identified data grouping (e.g., identified communication channel). The labeled data is provided via a network connection. For example, the labeled WebSocket messages are provided via a WebSocket connection to a receiver.

The WebSocket protocol enables traditional half-duplex Hypertext Transfer Protocol (HTTP) communication to be upgraded to a bi-directional, full-duplex communication channel over a Transmission Control Protocol (TCP) connection. The WebSocket protocol has been standardized by the Internet Engineering Task Force (IETF) standards organization as RFC 6455. The WebSocket protocol, as standardized, was intended to be a generalized protocol and may lack extended functionality that may be desired by a user. The WebSocket protocol standard allows the protocol to be extended using extensions to support new functionality not implemented by the standard. Typical WebSocket protocol extensions must be negotiated when a new WebSocket connection is being established. During the WebSocket initialization process, desired extensions are advertised and a confirmation is provided on which of the desired extensions will be supported for the established WebSocket connection. Because the WebSocket connection negotiation is often handled by a web browser, only extensions implemented by the web browser vendor (e.g., coded in an inaccessible trusted codebase of the web browser) are typically supported in a WebSocket connection. Therefore, addition and customization of WebSocket protocol extensions may not be possible by an entity outside of the web browser vendor. In some embodiments, by introducing a second negotiation process after the WebSocket connection has been established, additional and/or different WebSocket extensions can be negotiated/initialized (e.g., without modifying internal code of the web browser).

The WebSocket protocol has been standardized by the Internet Engineering Task Force (IETF) standards organization as RFC 6455 (available at http://tools.ietf.org/html/rfc6455). RFC 6455 includes details on the initialization handshake and data framing of the WebSocket protocol. As specified in RFC 6455, once a WebSocket connection has been established using the handshake process between at least two communicating nodes, WebSocket communication is performed by transmitting WebSocket frames. A high-level overview of bits contained in a WebSocket frame is given in the following Table 1 reproduced from RFC 6455.

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-------+-+-------------+-------------------------------+
|F|R|R|R| opcode|M| Payload len |    Extended payload length    |
|I|S|S|S|  (4)  |A|     (7)     |             (16/64)           |
|N|V|V|V|       |S|             |   (if payload len==126/127)   |
| |1|2|3|       |K|             |                               |
+-+-+-+-+-------+-+-------------+ - - - - - - - - - - - - - - - +
|     Extended payload length continued, if payload len == 127  |
+ - - - - - - - - - - - - - - - +-------------------------------+
|                               |Masking-key, if MASK set to 1  |
+-------------------------------+-------------------------------+
| Masking-key (continued)       |          Payload Data         |
+-------------------------------- - - - - - - - - - - - - - - - +
:                     Payload Data continued ...                :
+ - - - - - - - - - - - - - - - - - - - - - - - - - - - - - - - +
|                     Payload Data continued ...                |
+---------------------------------------------------------------+
```

As shown above, the beginning portions of a WebSocket frame include metadata information regarding the configuration of data contained in the WebSocket frame. Additional details on the groups of bits in the WebSocket frame may be found in RFC 6455. The ending section of the WebSocket frame includes the actual payload data (e.g., application level data). The location of the payload data within the WebSocket frame may vary depending on the size of the payload data and whether a masking key is utilized. WebSocket frames are base units of communication data framing in WebSocket communication. By default, the WebSocket protocol may use port 80 for regular WebSocket connections and port 443 for WebSocket connections tunneled over Transport Layer Security (TLS).

FIG. 1 is a diagram illustrating an example WebSocket communication environment. Client 102 and client 103 are connected to server 110, WebSocket edge gateway 111 and WebSocket gateway 112 via network 108. Server 114 may be accessed by client 102 and client 103 via WebSocket edge gateway 111 and/or WebSocket gateway 112. Examples of client 102/103 include a computer, a tablet device, a smartphone, and any computing device. Client 102 or client 103 may be used by a user to access services and/or content at least in part provided by server 110 and/or server 114. For example, server 110/114 hosts web content that is obtained by client 102. Any type of data and service may be provided by server 110 and server 114. In some embodiments, an HTTP/HTTPS connection between client 102 (or client 103) and server 110 is requested by client 102/103 to be upgraded to a WebSocket connection. In some embodiments, a stream of an SPDY protocol connection is requested to be upgraded to a WebSocket connection. In various embodiments, other protocol such as SPDY may be utilized on top of an established WebSocket connection. Server 110 may handle the request and communicate with client 102/103 using the WebSocket protocol. In some embodiments, a WebSocket upgrade request received by server 110/114 is forwarded to WebSocket gateway 112 and/or WebSocket edge gateway 111 for handling. WebSocket gateway 112 and/or WebSocket edge gateway 111 may handle WebSocket upgrade requests, a WebSocket initialization handshake, the WebSocket connection configuration, WebSocket extension processing, and handling of WebSocket communication for server 110/114 and/or client 102/103. In some embodiments, once a WebSocket upgrade request received by server 110/114 is forwarded to WebSocket gateway 112 and/or WebSocket edge gateway 111 for handling, data/services provided using the WebSocket protocol may be handled by WebSocket gateway 112 and/or WebSocket edge gateway 111 for server 110/114.

In some embodiments, communication between client 102 (or client 102) and server 110 (or server 114) is routed through WebSocket edge gateway 111 and WebSocket gateway 112. For example, client 102 establishes a connection (e.g., WebSocket connection or other type of connection) with WebSocket edge gateway 111, gateway 111 establishes a connection (e.g., WebSocket connection) with WebSocket gateway 112, and gateway 112 establishes a connection (e.g., WebSocket connection or other type of connection) with server 110/114. Thus when a data request is sent by client 102/103 for server 110/114, the request is first routed to edge gateway 111 then to gateway 112 before arriving at server 110/114. When server 110/114 sends the requested data, the data is first routed through gateway 112 then to edge gateway 111 before arriving at client 102/103.

A plurality of WebSocket edge gateways may connect to WebSocket gateway 112 configured to provide a WebSocket interface for a content/service source (e.g., server 110/114). For example, although a plurality of clients may directly connect to WebSocket gateway 112 to receive content of a server serviced by WebSocket gateway 112, it may be more efficient for a client to connect to a local WebSocket edge gateway that is located closer (e.g., located closer in geography, located in a closer network topology, etc.) to the client than WebSocket gateway 112 and allow the communication path between the local WebSocket edge gateway and WebSocket gateway 112 to be optimized for more efficient content delivery between the gateways. A use of a WebSocket extension negotiated between WebSocket edge gateway 111 and WebSocket gateway 112 may allow optimization of content between the gateways.

In the example of FIG. 1, WebSocket edge gateway 111 is located close (e.g., geographically close) to client 102 and client 103 and clients 102 and 103 may connect to WebSocket edge gateway 111 to communicate with server 110 or 114 using WebSocket gateway 112. Other clients may connect to different WebSocket edge gateways (not shown in FIG. 1) that are located closer to these other clients than gateway 111 to communicate with server 110 or 114 via WebSocket gateway 112. One example of an optimization enabled by the use of both WebSocket edge gateway 111 and WebSocket gateway 112 includes reduction of duplicated communication. For example, client 102 and client 103 are both connected to server 114 via both WebSocket edge gateway 111 and WebSocket gateway 112, and both clients desire to receive the same data from server 114. Rather than sending the same data twice (i.e., one to client 102 and one to client 103) via different network connections through the same network path, server 110 sends the data once to gateway 112 and gateway 112 links together each network connection to each client and sends the data once to edge gateway 111 that broadcasts/fans out the data to both client 102 and client 103.

In some embodiments, a connection between any two components shown in FIG. 1 may be requested to be upgraded to a WebSocket connection. For example, an HTTP or HTTPS connection between client 102/103 and one of WebSocket edge gateway 111, server 110, server 114 or WebSocket gateway 112 is requested by client 102/103 to be upgraded to a WebSocket connection.

WebSocket gateway 112 enables content and/or services provided by server 110/114 to be accessed via a WebSocket protocol. For example, WebSocket gateway 112 handles WebSocket upgrade requests, a WebSocket initialization handshake, WebSocket connection configuration, WebSocket extension processing, and handling of WebSocket frames for server 110/114. WebSocket gateway 112 may proxy communication between client 102/103 and server 110/114, at least in part by allowing WebSocket gateway 112 to encode communication sent by server 110/114 into WebSocket frames to be sent to client 102/103 (e.g., via edge gateway 111) and decoding received WebSocket frames from client 102/103 (e.g., via edge gateway 111) into a data format desired by server 110/114. By utilizing WebSocket gateway 112, server 110/114 can take advantage of the WebSocket protocol without the need to directly implement the entire WebSocket protocol. In some embodiments, WebSocket gateway 112 and server 114 are included in the same device. For example, a content/service provider server directly supports the WebSocket protocol.

WebSocket edge gateway 111 may enable client 102/103 to utilize a WebSocket protocol. For example, WebSocket edge gateway 111 handles WebSocket upgrade requests, WebSocket initialization handshakes, the WebSocket connection configuration, WebSocket extension processing, and handling of WebSocket frames for client 102/103. WebSocket edge gateway 111 may proxy communication between client 102/103 and server 110/114, at least in part by allowing WebSocket edge gateway 111 to encode communication sent by client 102/103 into WebSocket frames to be sent to server 110/114 (e.g., via gateway 112) and decoding received WebSocket frames from server 110/114 (e.g., via gateway 112) into a data format desired by client 102/103. By utilizing WebSocket edge gateway 111, client 102/103 can take advantage of the WebSocket protocol without the need to directly implement the entire WebSocket protocol.

Client 102/103 includes operating system level application (OS App) 104/105, respectively. OS App 104/105 is at least in part hosting (e.g., at least in part executing) web application 106/107, respectively. For example, OS App 104/105 is a web browser and web application 106/107 is a JavaScript application executed using the web browser. In another example, OS App 104/105 is a mobile device application and web application 106/107 is a component of the mobile device application. Other examples of OS App 104/105 include any application executing on an operating system hosted by client 102/103. In some embodiments, protocol level processing of WebSocket communication is handled by OS App 104/105 for web application 106/107. For example, when a WebSocket connection is requested by web application 106/107, OS App 104/105 handles the handshake, protocol control, protocol configuration, and WebSocket frame and message processing to allow only the web application level data contained in a payload portion of a WebSocket frame to be sent to web application 106/107.

In some embodiments, the protocol level processing of OS App 104/105 is handled by a portion of OS App 104/105 that can only be modified by a developer with access to the protected internal code of OS App 104/105. In order to extend the WebSocket protocol, a software library utilized by web application 106/107 may be utilized to handle custom WebSocket protocol extensions (e.g., WebSocket protocol extensions not directly supported by the operating system level application). In some embodiments, a standard WebSocket library (e.g., standard WebSocket library for JavaScript) that exposes WebSocket capability to web application 106 is replaced with a custom WebSocket software library (e.g., custom WebSocket software library for JavaScript) that allows custom WebSocket protocol extensions to be dynamically utilized without modifying protected internal (e.g., native) code of the OS App. The custom WebSocket library may be backwards compatible with the standard WebSocket library. For example, a web application coded using the standard WebSocket library may utilize the custom WebSocket library (e.g., same syntax and base functionality and conforms to the same WebSocket application programming interface (API)). In some embodiments, web application 106 is configured to use the custom WebSocket library when a code of web application 106/107 is modified to utilize the custom WebSocket library instead of a standard WebSocket library. For example, when a component (e.g., JavaScript code) of web application 106/107 is obtained from server 114 via network 108, edge gateway 111, and gateway 112, edge gateway 111 and/or gateway 112 modifies the component to utilize the custom WebSocket library (e.g., inserts code to load the custom WebSocket library).

In some embodiments, an intermediate software process/object interfacing between OS App 104/105 and web application 106/107 handles WebSocket extension negotiation, configuration, and processing. For example, the intermediate process/object initializes and negotiates custom WebSocket extensions to be utilized and intercepts data traffic between OS App 104/105 and web application 106/107 to handle processing required by one or more utilized custom WebSocket extensions. In some embodiments, the intermediate process/object is a process/object of a custom WebSocket library (e.g., web application 106/107 is configured to use the custom WebSocket library when a code of web application 106/107 is modified to utilize the custom WebSocket library instead of a standard WebSocket library). In some embodiments, OS App 104 is customizable and protocol level processing of OS App 104/105 may be modified by an outside developer. For example, an add-on program coded for OS App 104/105 may modify protocol level processing of OS App 104/105. This add-on program may enable custom/dynamic WebSocket protocol extensions.

Examples of network 108 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. One or more of the components shown in FIG. 1 may be included in the same machine. Other communication paths may exist and the example of FIG. 1 has been simplified to illustrate the example clearly. Although single instances of components have been shown to simplify the diagram, additional instances of any of the components shown in FIG. 1 may exist. For example, multiple clients may be communicating with multiple servers that may be utilizing multiple WebSocket edge gateways and multiple WebSocket gateways. Additional OS Apps and web applications may be hosted by client 102/103. Components not shown in FIG. 1 may also exist.

Figure 2:
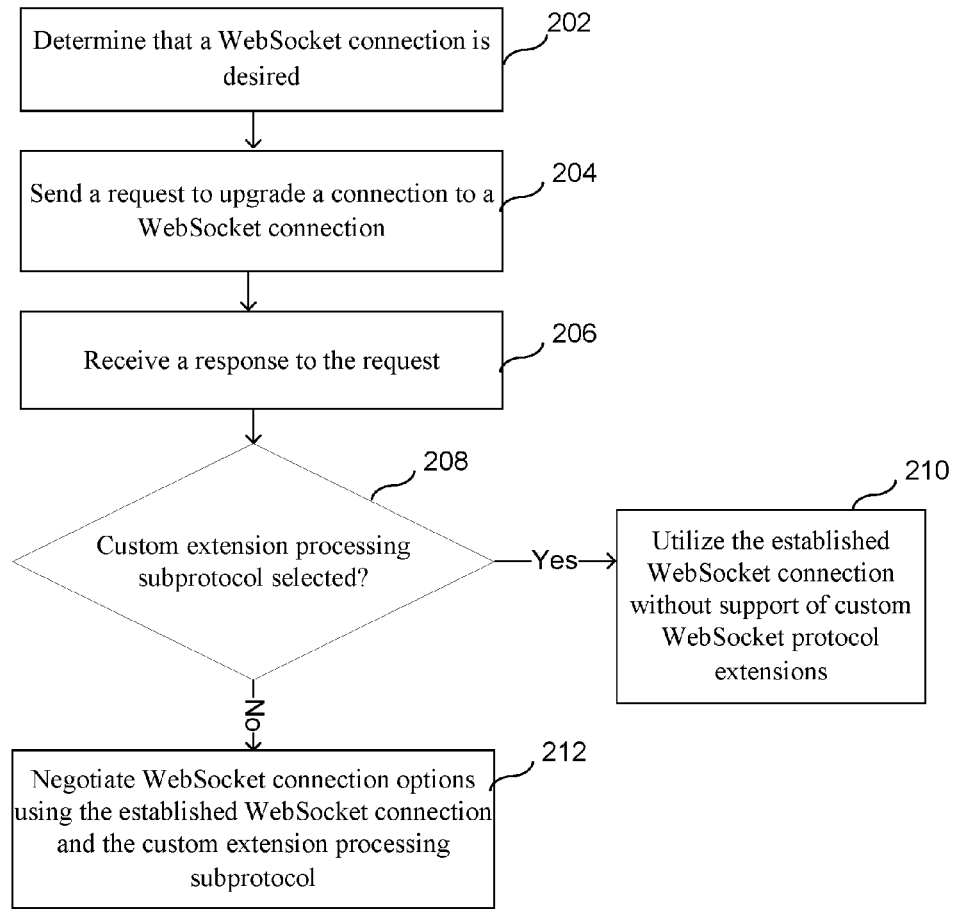
FIG. 2 is a flowchart illustrating an embodiment of a process for requesting a WebSocket connection.

FIG. 2 is a flowchart illustrating an embodiment of a process for requesting a WebSocket connection. At least a portion of the process of FIG. 2 may be implemented on one or more components of client 102 and/or client 103 of FIG. 1. In some embodiments, at least a portion of the process of FIG. 2 is implemented on WebSocket edge gateway 111, WebSocket gateway 112, server 110, and/or server 114 of FIG. 1.

At 202, it is determined that a WebSocket connection is desired. In some embodiments, determining that the WebSocket connection is desired includes receiving a request (e.g., from an application such as web application 106/107 of FIG. 1) that a WebSocket connection is desired. In some embodiments, determining that the WebSocket connection is desired includes detecting that a WebSocket connection is desired. In some embodiments, determining that the WebSocket connection is desired is associated with visiting a website, launching an application, and/or a request to obtain content available via a WebSocket connection. In some embodiments, determining that the WebSocket connection is desired is associated with data transport servers establishing connection with each other. For example, a WebSocket edge gateway desires to establish a WebSocket connection with a WebSocket gateway. In some embodiments, determining that the WebSocket connection is desired is associated with a connection between a gateway and a server. For example, a WebSocket gateway desires to establish a WebSocket connection with a server that will be providing desired content/service.

The determination that a WebSocket connection is desired may be associated with an existing HTTP/HTTPS connection that is to be upgraded to a WebSocket connection. In some embodiments, the determination that a WebSocket connection is desired is made by an operating system level application such as OS App 104 of FIG. 1. For example, a web application running on a web browser signals to the web browser that an HTTP/HTTPS connection is to be upgraded to a WebSocket connection. In another example, when an application such as a mobile application is launched, an HTTP/HTTPS connection to a server is initialized and it is determined that the HTTP/HTTPS connection is to be upgraded to a WebSocket connection. In some embodiments, the WebSocket connection enables the half-duplex HTTP/HTTPS communication to be upgraded to a bi-directional, full-duplex communication channel over a TCP connection or any other bidirectional byte stream with guaranteed delivery and ordering.

In some embodiments, determining that the WebSocket connection is desired includes obtaining a component that can be utilized to handle custom/dynamic WebSocket extensions. For example, in order to extend the WebSocket protocol, a software library utilized by a web application such as web application 106 of FIG. 1 or utilized by an application such as a mobile device application to handle custom and dynamic WebSocket extensions is obtained. In some embodiments, a standard WebSocket library (e.g., standard WebSocket library for JavaScript) that implements the WebSocket API for an application is replaced with a custom software library (e.g., custom WebSocket library for JavaScript) that allows custom WebSocket extensions to be dynamically utilized. The custom WebSocket library may be backwards compatible with the standard WebSocket library. For example, a web application coded using the standard WebSocket library may utilize the custom WebSocket library (e.g., conforms to the same WebSocket API). In some embodiments, obtaining the component includes receiving program code configured to use the custom WebSocket library rather than a standard WebSocket library. For example, when the component (e.g., JavaScript code) is requested, a gateway such as gateway 112 of FIG. 1 modifies the component obtained from a server to utilize the custom WebSocket library (e.g., inserts code to load the custom WebSocket library) and provides the modified component. Subsequent calls to a WebSocket API to establish a WebSocket connection are handled by the replacement custom WebSocket library rather than the standard WebSocket library that has been replaced.

At 204, a request to upgrade a connection to a WebSocket connection is sent. The request may be sent to a server of the connection such as server 110/114, and/or gateway 111/112 of FIG. 1. In some embodiments, sending the request includes initializing a WebSocket handshake to upgrade the connection. The connection may be an already established HTTP/HTTPS connection and/or a new HTTP/HTTPS connection established in response to the determination made at 202. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the request to update the connection is managed by an operating system-level application such as OS App 104/105 of FIG. 1. In some embodiments, sending the request includes performing a WebSocket initialization handshake as specified in the WebSocket standard. For example, the request includes a specification of one or more supported subprotocols that can be utilized for the WebSocket connection. For example, data to be communicated using the WebSocket connection is to be formatted using a subprotocol (e.g., Advanced Message Queuing Protocol (AMQP)) communicated over the WebSocket protocol. The WebSocket standard allows one or more subprotocols to be identified in a WebSocket connection request and the other communication party (e.g., server) selects one of the specified subprotocols to be utilized for the WebSocket connection. In some embodiments, the request includes identification of one or more extended capabilities of a client that are not directly specified in the WebSocket protocol standard (i.e., WebSocket protocol extensions). For example, the request includes one or more identifiers of one or more extended capabilities of the WebSocket protocol that are supported by a client sending the request. A server/gateway receiving the request may choose to support one or more of the identified extensions in the WebSocket connection being established.

In some embodiments, a WebSocket connection requested in 204 is requested by a web application such as web application 106/107 of FIG. 1 and the request is made via a software library component (e.g., JavaScript library component handling WebSocket, Ruby on Rails component handling Web Socket, or any other programming language library component handling WebSocket) that interfaces with an operating system level application (e.g., a web browser) such as OS App 104/105 of FIG. 1 to establish the WebSocket connection. Typically, the web application provides, to a process of the software library component, one or more identifiers of desired subprotocols to be utilized for a WebSocket connection to be established and the process provides the identifiers to the web browser that will be establishing the WebSocket connection. In some embodiments, the operating system level application (e.g., a web browser) requests predetermined WebSocket protocol extensions supported by the operating system level application. In some embodiments, a custom software library component (e.g., component received at 202) of an application (e.g., web application 106/107 of FIG. 1) supports WebSocket protocol extensions that are not natively supported by an operating system level application (e.g., a web browser). For example, a process implementing the custom software library component establishes a WebSocket connection using a custom extension processing subprotocol used to configurably enable WebSocket extensions not directly implemented/supported by the operating system level application. A process of the custom software library component may perform a second level of negotiations after a WebSocket connection has been established to configure a requested subprotocol (e.g., subprotocol requested by web application when requesting WebSocket connection) and any additional custom WebSocket protocol extensions to be utilized for the WebSocket connection. The process of the custom software library component may also serve as an intermediary to translate between the first subprotocol used to enable custom WebSocket extensions and a different requested subprotocol of the underlying web application and to intercept and process WebSocket communication needed to handle the custom WebSocket protocol extensions.

In some embodiments, when a web application such as web application 106 of FIG. 1 or another type of application (e.g., mobile device application) requests a WebSocket connection that will use one of one or more identified subprotocols, a custom software library component handling WebSocket communication attempts to establish a WebSocket communication that will use a different subprotocol. For example, the web application requests to the custom software library component a WebSocket connection utilizing an AMQP subprotocol, and the custom software library component requests to an operating system level program a WebSocket connection that can utilize the custom extension processing subprotocol rather than the AMQP subprotocol, if possible. The operating system level program requests a WebSocket connection that will utilize the requested subprotocol(s) of the custom software library component.

The example below shows at least a portion of the contents of the request to upgrade the connection. The request example below may be provided by client 102 to a server of the connection such as server 110, server 114, WebSocket edge gateway 111, and/or WebSocket gateway 112 of FIG. 1. The request example below may also be provided between WebSocket edge gateway 111 and WebSocket gateway 112 of FIG. 1.

GET /amqp HTTP/1.1
Host: server.example.com
Upgrade: websocket
Sec-WebSocket-Protocol: x-kaazing-handshake, amqp
Sec-WebSocket-Extensions: E1-native The first three lines of this example conform to the Web Socket standard for requesting a connection to be upgraded to a WebSocket connection with the end point of the WebSocket connection being "/amqp" and the host in use as "server.example.com."

The line beginning with "Sec-WebSocket-Protocol:" identifies the potential subprotocols that can be used for the WebSocket connection to be established. In the example above, the request identifies two subprotocols that may be used for the WebSocket connection to be established and a server receiving the request is to select at most one of the subprotocols to be utilized for the WebSocket connection. The "amqp" identifier identifies that an AMQP protocol (e.g., a subprotocol identified by a web application such as web application 106/107 of FIG. 1) is one of the possible subprotocols that may be utilized to encode data traffic of the WebSocket connection. The "x-kaazing-handshake" identifier identifies that a custom protocol identified as "x-kaazing-handshake" is identified as another one of the possible WebSocket connections. This custom protocol is a subprotocol requested by a custom software library component to enable custom WebSocket protocol extensions. For example, the web application requests to the custom software library component a WebSocket connection utilizing an AMQP subprotocol, and the custom software library component requests to an operating system level program a WebSocket connection that can utilize the "x-kaazing-handshake" subprotocol rather than the AMQP subprotocol, if possible. By requesting the custom "x-kaazing-handshake" subprotocol, a requesting client is advertising to a receiving server that the client is able to handle custom WebSocket extensions using the "x-kaazing-handshake" subprotocol. If the "x-kaazing-handshake" ends up being selected as the subprotocol to be utilized, the client and the server of the WebSocket connection can communicate with each other using this custom protocol to negotiate and handle custom WebSocket protocol extensions.

The line beginning with "Sec-WebSocket-Extensions:" identifies any number of WebSocket protocol extensions that can be supported by a client sending the request. A receiving server may choose any number of the identified extensions to be utilized for the WebSocket connection to be established. Typically the supported WebSocket protocol extensions are ones natively supported by an operating system level application such as a web browser. Support for new or custom extensions often cannot be achieved without modifying code of the operating system level application, which may be difficult to achieve by a party without access to the protected internal code of the operating system application. In the example above, the request identifies a WebSocket extension identified as "E1-native." This extension is an extension natively supported by an operating system level application requesting the WebSocket connection and is requested by the operating system level application for every WebSocket connection requested.

At 206, a response to the request is received. In some embodiments, the request is received from a server such as server 110/114 or a gateway such as gateway 112 of FIG. 1. In some embodiments, the response conforms to the handshake response of the WebSocket standard. In some embodiments, the response confirms whether a WebSocket connection has been successfully established. In some embodiments, if the response indicates that a WebSocket connection has not been successfully established, the process ends and an error message is provided. In some embodiments, the response includes an identifier of a subprotocol selected from a list of one or more supported subprotocols identified in the request sent at 204. In some embodiments, the response includes an identifier of one or more WebSocket extensions selected from a list of one or more supported extensions identified in the request sent at 204. The example below shows at least a portion of the contents of the received response.

HTTP/1.1 101 Switching Protocols
Upgrade: websocket
Connection: Upgrade
Sec-WebSocket-Protocol: x-kaazing-handshake
Sec-WebSocket-Extensions: E1-native The three lines of the example above confirms (e.g., identified by the identifier "101") that the requested WebSocket connection has been successfully established. The line beginning with "Sec-WebSocket-Protocol:" identifies the selected subprotocol that will be utilized by the established WebSocket connection. In the example above, "x-kaazing-handshake" has been selected. The selection of this custom protocol signifies that the server that received the request sent in 204 supports custom WebSocket protocol extensions and this custom subprotocol can be used to negotiate and process the custom extensions. The line beginning with "Sec-WebSocket-Extensions:" identifies any number of selected WebSocket protocol extensions that will be utilized in the established WebSocket connection. In the example above, a WebSocket protocol extension natively supported by an operating system level program and identified as the "E1-native" has been selected.

At 208, it is determined whether a custom extension processing subprotocol has been selected. In some embodiments, determining whether the custom subprotocol has been selected includes analyzing the response received at 206 to determine which subprotocol has been selected as the utilized subprotocol and determining whether the selected subprotocol is the custom extension processing subprotocol requested in the request provided at 204. For example, it is determined whether the selected protocol is the "x-kaazing-handshake" protocol described in the previously described examples. The selection of this custom subprotocol signifies that the server that received the request sent in 204 supports custom WebSocket protocol extensions and this custom subprotocol can be used to communicate and handle the custom extension processing. If the custom extension processing subprotocol has not been selected, it signifies that the server that received the request sent in 204 does not support custom extensions. For example, the "amqp" protocol described in the previously described examples has been selected as the subprotocol and it is determined that the custom extension processing subprotocol has not been selected.

If at 208 it is determined that the custom extension processing subprotocol has not been selected, at 210, the established WebSocket connection is utilized without support of custom WebSocket protocol extensions. For example, it is determined that additional and/or configurable WebSocket protocol extensions that may be desired in addition to any natively supported extensions (e.g., extensions supported by a web browser) cannot be utilized. In an alternative embodiment, if it is determined that the custom extension processing subprotocol has not been selected, the process ends and an error indicator is provided.

If at 208 it is determined that the custom extension processing subprotocol has been selected, at 212, WebSocket connection options are negotiated using the established WebSocket connection and the custom extension processing subprotocol. In some embodiments, negotiating the WebSocket connection options includes identifying a subprotocol and any number of custom WebSocket protocol extensions to be utilized for the established WebSocket connection. For example, a second handshake process similar to the first handshake performed at 204 and 206 (e.g., conforms to WebSocket standard handshake) is performed using the custom subprotocol negotiated during the first handshake.

In some embodiments, negotiating the WebSocket connection options includes providing a secondary request (e.g., second request). The secondary request may be provided via the established WebSocket connection using the WebSocket protocol and WebSocket communication frames. The request may be provided from a client such as client 102 to server 110/114 and/or gateway 111/112 of FIG. 1. The request may be provided between gateways such gateways 111 and 112 of FIG. 1. In some embodiments, the request conforms to the WebSocket standard for the WebSocket initialization handshake. The request may include identification of one or more desired subprotocols and identification of any additional custom WebSocket protocol extensions to be utilized for the established WebSocket connection.

The example below shows at least a portion of the contents of the request.

GET /amqp HTTP/1.1
Host: server.example.com
Upgrade: websocket
Sec-WebSocket-Protocol: amqp
Sec-WebSocket-Extensions: E2-application The first three lines of the example conform to the WebSocket standard for requesting a connection to be upgraded to a WebSocket connection with the end point of the WebSocket connection of "/amqp" and the host in use as "server.example.com." Because the WebSocket connection has been established, these lines may not be utilized for the purpose of establishing a WebSocket connection. These lines may be utilized to maintain compatibility. In some embodiments, these lines are optional and/or not included in the request. For example, only data different from the request sent in 204 is sent at 212.

The line beginning with "Sec-WebSocket-Protocol:" identifies the potential subprotocols that can be used for the WebSocket connection. Because a WebSocket connection with the custom protocol has been already established, the subsequently identified subprotocols identify the supported protocols of the end WebSocket communication user application such as web application 106/107 of FIG. 1, and one of the identified subprotocols will be selected by a receiving server such as gateway 111/112 of FIG. 1 for use (e.g., selected subprotocol encoded data is encoded using the custom subprotocol and the custom subprotocol encoded data is encoded in WebSocket protocol) in the established WebSocket connection. The "amqp" identifier identifies that an AMQP protocol (e.g., a subprotocol requested by a web application such as web application 106/107 of FIG. 1) is one of the possible subprotocols that may be utilized for the WebSocket connection. For example, if this subprotocol is selected, an AMQP subprotocol will be communicated over the "x-kaazing-handshake" subprotocol that is communicated over the WebSocket protocol of the WebSocket connection.

The line beginning with "Sec-WebSocket-Extensions:" identifies any number of custom WebSocket protocol extensions that can be supported for the established WebSocket connection. In some embodiments, these custom WebSocket protocol extensions are not natively supported by an operating system level application such as OS App 104/105 of FIG. 1. The custom WebSocket protocol extensions may be implemented by a custom software library (e.g., a custom WebSocket library that replaced a standard WebSocket library) of an application such as web application 106 of FIG. 1. In some embodiments, the custom WebSocket protocol extensions to be supported may be preconfigured and/or dynamically determined. In some embodiments, the custom WebSocket protocol extensions to be requested are preconfigured in a custom software library. In some embodiments, the custom WebSocket protocol extensions to be requested are determined from dynamically received configuration data. For example, specification of which custom WebSocket protocol extensions to request and program code implementing the custom WebSocket protocol extensions are received at one or more components of client 102/103 from gateway 111/112 of FIG. 1. A receiving server may choose any number of the identified extensions to be utilized for the WebSocket connection. In the example above, the request identifies a WebSocket extension identified as "E2-application." This extension identified a desired custom extension to be supported on the established WebSocket connection being utilized to send the request.

In some embodiments, negotiating the WebSocket connection options includes receiving a secondary response (e.g., second response). The response may be received via the established WebSocket connection using the WebSocket protocol and WebSocket communication frames. The response may be received at a client such as client 102/103 from server 110 and/or gateway 111/112 of FIG. 1. The response may be also received at gateway 111 from gateway 112 of FIG. 1. In some embodiments, the response conforms to the WebSocket standard for the WebSocket initialization handshake. The response may include identification of a subprotocol (e.g., one of the subprotocols identified in the secondary request) and an identification of any number of supported custom extensions (e.g., one or more of the requested custom extensions in the secondary request).

The example below shows at least a portion of the contents of the received response.

HTTP/1.1 101 Switching Protocols
Sec-WebSocket-Protocol: amqp
Sec-WebSocket-Extensions: E2-application The first line of the example above includes a status indicator indicating a status of the secondary request (e.g., second request). In some embodiments, the status indictor conforms to the WebSocket standard handshake response indicator and/or an HTTP status code. In the example above, the identifier "101" indicates that a subprotocol and supported custom extensions have been successfully negotiated and are ready to be utilized. In some embodiments, negotiating the WebSocket connection options includes performing one or more steps based on the received status indicator. For example, a status indicator of "401 Authentication required" is received and negotiating the WebSocket connection options includes authenticating an identity of the sender of the request by providing authentication credentials. The line beginning with "Sec-WebSocket-Protocol:" identifies the selected subprotocol that will be utilized by the established WebSocket connection. In the example above, "amqp" has been selected. The selection of this protocol signifies that the server that received the request sent in 204 supports the AMQP subprotocol and this subprotocol will be communicated over the custom subprotocol (e.g., "x-kaazing-handshake" subprotocol). The line beginning with "Sec-WebSocket-Extensions:" identifies any number of selected custom WebSocket protocol extensions that will be utilized in the established WebSocket connection. In the example above, a WebSocket protocol extension not natively supported by an operating system level program (e.g., custom extension) and identified as the "E2-applicaton" has been selected and identified as being supported.

Figure 3:
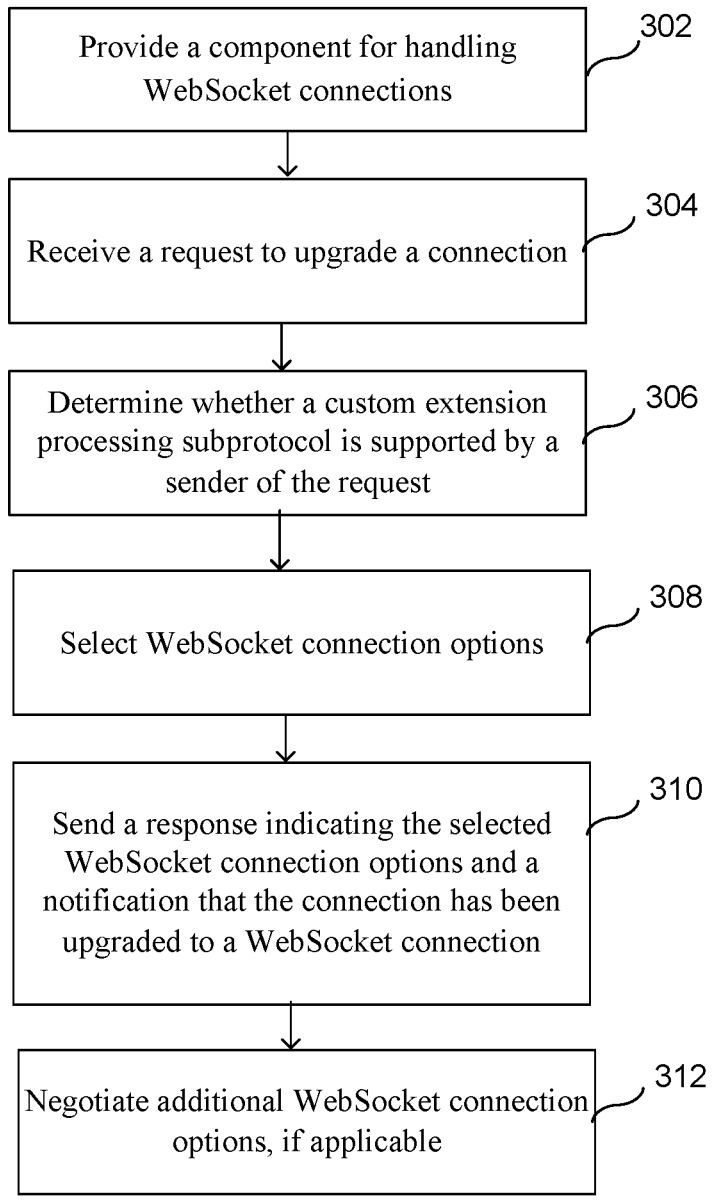
FIG. 3 is a flowchart illustrating an embodiment of a process for confirming a request to establish a WebSocket connection.

FIG. 3 is a flowchart illustrating an embodiment of a process for confirming a request to establish a WebSocket connection. The process of FIG. 3 may be implemented on one or more components of server 110, server 114, WebSocket edge gateway 111, and/or WebSocket gateway 112. In some embodiments, the process of FIG. 3 is at least in part implemented by a receiving communication party of one or more requests sent using at least a portion of the process of FIG. 2.

At 302, a component for handling WebSocket connections is provided. In some embodiments, providing the component includes providing a component that can be utilized to handle custom WebSocket protocol extensions. For example, in order to extend the WebSocket protocol, a software library component to be utilized by a web application such as web application 106 of FIG. 1 or to be utilized by an application such as a mobile device application to handle custom WebSocket protocol extensions is provided. In some embodiments, a standard WebSocket library (e.g., standard WebSocket library for JavaScript) that implements a WebSocket API for an application is to be replaced with the custom library (e.g., custom WebSocket library for JavaScript) that allows custom WebSocket extensions to be dynamically utilized. The custom WebSocket library may be backwards compatible with the standard WebSocket library. For example, a web application coded using the standard WebSocket library is configured to utilize the custom WebSocket library (e.g., conforms to the same WebSocket API). In some embodiments, providing the component includes providing program code configured to use the custom WebSocket library rather than a standard WebSocket library. For example, when code (e.g., JavaScript code of the web application) is requested, the code is modified to utilize a custom WebSocket library (e.g., insert additional code to load the custom WebSocket library) and the modified code is provided. Subsequent calls in the provided code to a WebSocket API to establish a WebSocket connection will be handled by the replacement custom WebSocket library rather than the standard WebSocket library that has been replaced.

At 304, a request to upgrade a connection is received. In some embodiments, the request includes the request sent at 204 of FIG. 2. In some embodiments, the request is associated with visiting a website, launching an application, and/or a request to obtain content available via a WebSocket connection. In some embodiments, the request was made by an operating system level application such as OS App 104/105 of FIG. 1. For example, a web browser has made the request in response to a web application running on the web browser that has requested the WebSocket connection. In another example, when an application such as a mobile application is launched, an HTTP/HTTPS connection to a server for the mobile application is initialized and a request to upgrade the HTTP/HTTPS connection is sent to the server.

In some embodiments, the request is associated with initializing a WebSocket handshake to upgrade the connection. The connection may be an already established HTTP/HTTPS connection and/or a new HTTP/HTTPS connection established in response to the determination made at 202 of FIG. 2. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the received request initializes an opening handshake as described in the WebSocket standard. In some embodiments, the request includes identification of one or more capabilities of a client that are not directly implemented in the WebSocket protocol standard. For example, the request includes one or more identifiers of one or more extended capabilities of the WebSocket protocol that are supported by a client sending the request.

At 306, it is determined whether a custom extension processing subprotocol is supported by a sender of the request. In some embodiments, determining whether the custom subprotocol is supported includes analyzing the request received at 304 and determining whether an identifier of the custom subprotocol is included in the list of supported subprotocols provided in the request. For example, it is determined whether the protocol "x-kaazing-handshake" described in examples of FIG. 2 is included in the request. The support of this custom subprotocol may signify that the sender of the request supports custom extensions and this custom subprotocol can be used to communicate and handle the custom extension processing. If the custom extension processing subprotocol has not been included, it may signify that the sender of the request does not support custom extensions.

At 308, WebSocket connection options are selected. In some embodiments, selecting the WebSocket connection options includes configuring the WebSocket connection and/or options associated with the WebSocket connection. In some embodiments, selecting the WebSocket connection options includes determining which one or more of the provided configuration options provided in the request received at 304 should be supported. In some embodiments, the received request includes a plurality of possible configuration options and only one of the options is to be selected by the receiver of the request. For example, the request includes one or more identifiers of subprotocols that can be utilized in the WebSocket connection being established and one of the identified subprotocols is selected. In some embodiments, if it is determined at 306 that the custom extension processing subprotocol is supported by the sender, the custom extension processing subprotocol is selected as the subprotocol of the WebSocket connection being established. In some embodiments, if it is determined at 306 that the custom extension processing subprotocol is not supported by the sender, another one of the subprotocols identified in the request received at 304 and determined to be supported by the receiver of the request is selected as the subprotocol of the WebSocket connection being established. In some embodiments, the received request includes a plurality of possible configuration options and one or more of the options are to be selected by the receiver of the request. For example, the request includes one or more identifiers of WebSocket protocol extensions (e.g., extended capability of the WebSocket protocol), and it is determined which of the WebSocket protocol extensions are supported by the receiver of the request. In some embodiments, if it is determined that the received request is not a valid request (e.g., a supported subprotocol not identified), a WebSocket connection is not established, an error response is provided, and the process ends.

At 310, a response indicating the selected WebSocket connection options and a notification that the connection has been upgraded to a WebSocket connection are sent. The response may be sent to a client by a server such as server 110, server 114, and/or WebSocket gateway 112 of FIG. 1. In another example, the response may be sent by one WebSocket gateway to another gateway (e.g., WebSocket gateway 112 sends the response to WebSocket edge gateway 111 of FIG. 1). In some embodiments, sending the response includes sending a response to a WebSocket handshake upgrade request received in 304. In some embodiments, sending the response includes completing an opening handshake as defined in the WebSocket standard. In some embodiments, the response sent at 310 includes the response received at 206 of FIG. 2.

At 312, additional WebSocket connection options are negotiated, if applicable. In some embodiments, additional WebSocket connection options are not negotiated if it was determined at 306 that the custom extension processing subprotocol is not supported by a sender of the request and/or a subprotocol selected at 308 is not the custom extension processing subprotocol.

In some embodiments, additional WebSocket connection options are negotiated if it was determined at 306 that the custom extension processing subprotocol is supported by a sender of the request and/or a subprotocol selected at 308 is the custom extension processing subprotocol. In some embodiments, negotiating the additional WebSocket connection options includes receiving a secondary request (e.g., second request). For example, the request sent at 212 of FIG. 2 is received. The request may be provided from a client such as client 102 to server 110 and/or gateway 111/112 of FIG. 1. In another example, the request may be provided from one gateway server to another (e.g., from gateway 111 to gateway 112 of FIG. 1). In some embodiments, the request conforms to the WebSocket standard for a WebSocket initialization handshake. The request may include identification of one or more subprotocols and identification of any additional custom WebSocket protocol extensions to be utilized for the established WebSocket connection.

For example, the request identifies potential subprotocols that can be used for the WebSocket connection. Because a WebSocket connection using the custom protocol has been already established, the identified subprotocols of the secondary request identify the supported protocols of an application such as web application 106/107 of FIG. 1 and/or the supported protocols of a gateway (e.g., WebSocket edge gateway 111 of FIG. 1). One of the identified subprotocols of the secondary request may be selected by a receiving server such as gateway 111/112 of FIG. 1 for use in the established WebSocket connection.

In another example, the secondary request identifies any number of custom WebSocket protocol extensions that can be supported in the established WebSocket connection. The custom WebSocket protocol extensions may be implemented by a custom software library component (e.g., component of a custom library that replaced a standard WebSocket library) provided at 302. In some embodiments, the custom WebSocket protocol extensions to be supported may be preconfigured and/or dynamically determined. In some embodiments, the custom WebSocket protocol extensions are preconfigured in the provided component of 302. In some embodiments, the custom WebSocket protocol extensions to be supported are determined from a dynamically received configuration. A receiving server may choose any number of the identified extensions to be utilized for the WebSocket connection.

In some embodiments, negotiating the additional WebSocket connection options includes sending a secondary response (e.g., second response). For example, the secondary response received at 212 of FIG. 2 is sent. The response may be sent via the established WebSocket connection using the WebSocket protocol and WebSocket communication frames. The response may be provided to a client such as client 102 from server 110 and/or gateway 111/112 of FIG. 1. In another example, the response may be provided to a gateway (e.g., gateway 111 of FIG. 1) from another gateway (e.g., gateway 112 of FIG. 1). In some embodiments, the response conforms to the WebSocket standard for a WebSocket initialization handshake. The response may include identification of a selected subprotocol (e.g., one of the subprotocols identified in the secondary request) and identification(s) of any number of supported custom extensions (e.g., one or more of the requested custom extensions in the secondary request). In some embodiments, the response includes a status indicator indicating a status of the secondary request. In some embodiments, the status indicator conforms to the WebSocket standard handshake response indicator and/or an HTTP status code. For example, an identifier "101" included in the response indicates that a subprotocol and supported custom extensions have been successfully negotiated and are ready to be utilized. In another example, a status indicator of "401 Authentication required" is included and negotiating the WebSocket connection options includes authenticating an identity of the sender of the request by verifying provided authentication credentials.

In some embodiments, in the event an operating system level application can be directly modified/supplemented to support additional and/or different WebSocket protocol extensions (e.g., by using a web browser plug-in, web browser add-on, web browser extension), the custom WebSocket protocol extensions described previously can be negotiated in a single negotiation rather than two negotiations (e.g., one request and one response rather than two requests and two responses). For example, a single request that identifies both the native and customized WebSocket protocol extensions (e.g., includes line "Sec-WebSocket-Extensions: E1-native, E2-application") is sent from a requesting client and the receiving server provides a single response confirming that the identified native and customized extensions are supported for an established WebSocket connection. In some embodiments, a determination (e.g., predetermined or dynamically determined) is made on whether to perform a double negotiation (e.g., described in the process of FIGS. 2 and/or 3) or a single combined negotiation based at least in part on whether an operating system level application has been modified/supplemented to support the combined negotiation. If a combined negotiation is supported, the customized subprotocol described in the processes of FIGS. 2 and/or 3 may not need to be utilized.

Figure 4:
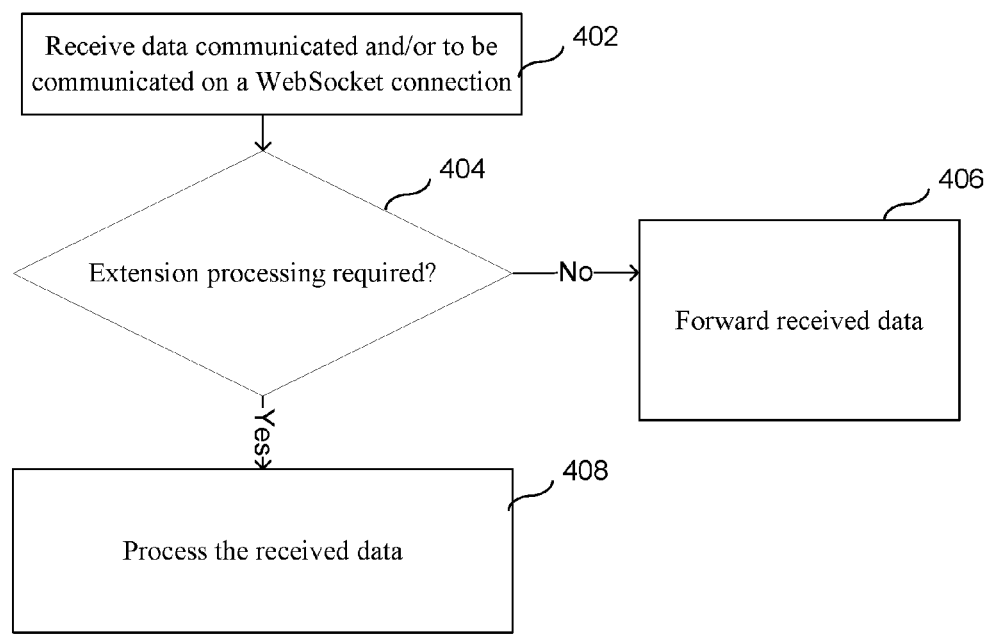
FIG. 4 is a flowchart illustrating an embodiment of a process for processing WebSocket communication data.

FIG. 4 is a flowchart illustrating an embodiment of a process for processing WebSocket communication data. The process of FIG. 4 may be implemented on one or more components of client 102, WebSocket edge gateway 111, WebSocket gateway 112, server 110, and/or server 114 of FIG. 1.

At 402, data communicated and/or to be communicated on a WebSocket connection is received. In some embodiments, the WebSocket connection includes the WebSocket connection established using the process of FIGS. 2 and/or 3. In some embodiments, the received data includes data to be communicated between an operating system level application (e.g., OS App 104/105 of FIG. 1) and a web application (e.g., web application 106/107 of FIG. 1). For example, a process of a custom software library implementing the WebSocket API intercepts communication to and/or from an operating system level application to perform any required processing to implement custom WebSocket protocol extensions. The custom software library may include the component provided at 302 of FIG. 3. The custom WebSocket protocol extensions may include custom WebSocket protocol extensions negotiated at 212 of FIG. 2 and/or 312 of FIG. 3. In some embodiments, the received data includes data received at a WebSocket edge gateway (e.g., from a client) to be processed and sent to another server (e.g., to a WebSocket gateway, a content server, etc.). In some embodiments, the received data includes data received at a WebSocket gateway (e.g., from a content provider) to be processed and sent to another server or destination (e.g., to a WebSocket edge gateway, a client, etc.). In some embodiments, the received data includes data received at a content server (e.g., server 110, server 114, etc.) to be processed and sent to a gateway or destination (e.g., to a WebSocket gateway, a client, etc.).

At 404, it is determined whether extension processing is required. In some embodiments, the determination is made at least in part by analyzing the received data. For example, it is determined that extension processing is required if a certain data (e.g., identifier bit(s), control byte sequence, etc.) is included in the contents of the received data. In some embodiments, determining whether extension processing is required includes determining any processing required to perform a function of a WebSocket protocol extension.

If at 404 it is determined that extension processing is not required, at 406, the received data is forwarded. In some embodiments, forwarding the received data includes converting from a first subprotocol to a second subprotocol before sending the received data to an intended destination. For example, data is translated between an "x-kaazing-handshake" protocol and an "amqp" protocol described in the examples above.

If at 404 it is determined that extension processing is required, at 408, the received data is processed. In some embodiments, processing the received data includes performing processing required to perform/implement a function of a WebSocket protocol extension. The processed data may be translated (from a first subprotocol to a second subprotocol) and/or forwarded to an intended destination.

Figure 5:
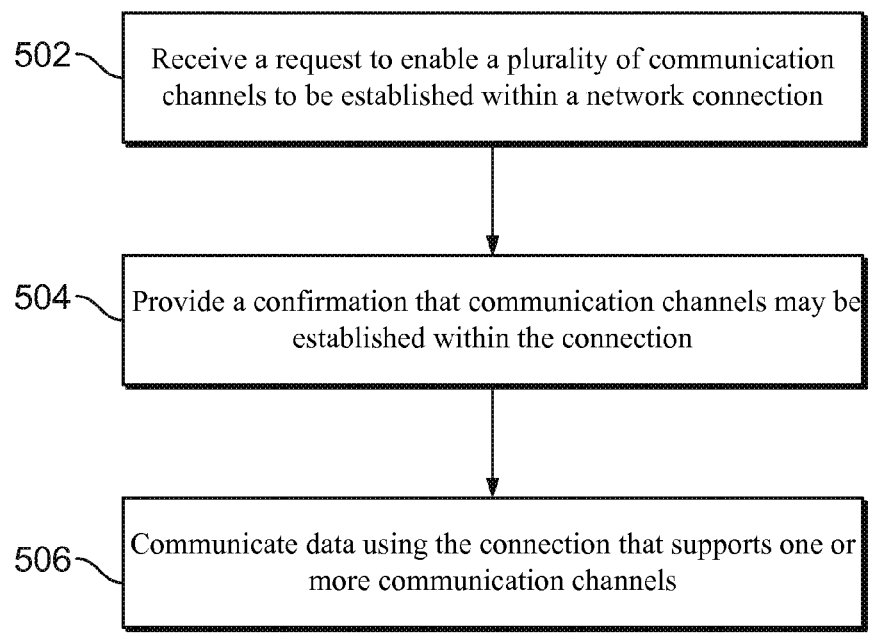
FIG. 5 is a flowchart illustrating an embodiment of a process for establishing communication channels.

FIG. 5 is a flowchart illustrating an embodiment of a process for establishing communication channels. The process of FIG. 5 may be implemented on a device enabling communication channels within a signal connection. In some embodiments, at least a portion of the process of FIG. 5 is implemented on WebSocket edge gateway 111, WebSocket gateway 112, server 110, and/or server 114 of FIG. 1.

For example, the process of FIG. 5 is implemented by WebSocket gateway 112. In this example, client 102 establishes a connection (e.g., WebSocket connection without multiple communication channel support) with WebSocket edge gateway 111 that in response establishes a connection with WebSocket gateway 112 requesting a WebSocket connection with support for multiple channels (e.g., to allow optimization of long haul connection between gateway 111 and gateway 112). WebSocket gateway 112 may then establish a connection with server 114 to obtain content to be delivered back to client 102 via the established connections.

At 502, a request to enable a plurality of communication channels to be established within a network connection is received. In some embodiments, the network connection is a WebSocket connection. WebSocket protocol enables bidirectional, full-duplex message flow. However, typically only a signal flow of messages may be provided in each direction. By enabling multiple communication channels, multiple independent message flows in each direction over the same WebSocket connection may be supported. For example, each established channel represents a separate bidirectional, full-duplex message flow. In some embodiments, by allowing multiple message channel flows to be established over a single WebSocket connection rather than over multiple WebSocket connections, only a single connection has to be established and the channels may share the properties of a single WebSocket connection (e.g., allows a single security authentication for the entire WebSocket connection to be established once and shared over all of its communication channels). In some embodiments, the communication channels do not support HTTP request-response conversation to proceed in parallel over the communication channels of a single connection. Communication channels may enable data to be communicated via the network connection to be categorized/grouped into groupings/channels. Content sent via the network connection may be labeled as belonging to one of one or more content groupings/channels/labels. For example, each WebSocket message is labeled with a communication channel identifier.

In some embodiments, the request is included in the request sent in 204 and/or an option negotiated in 212 of FIG. 2. In some embodiments, the request is included in the request received at 304 and/or an option negotiated in 312 of FIG. 3. For example, the request includes a request to support a WebSocket extension that enables a plurality of communication channels to be supported by a WebSocket connection. In some embodiments, the request is received via the network connection. For example, a request to upgrade the network connection to a WebSocket connection that supports multiple communications is received.

In an example, the following line is included in the request to enable a plurality of communication channels provided during negotiation of a WebSocket extension:
Sec-Web Socket-Extension: x-kaazing-channels; extensions=x-kaazing-fanout|x-kaazing-encryption
This line may be specified in a request to upgrade a network connection to a WebSocket connection (e.g., specified in 204 and/or received in 304) or specified in a request to negotiate one or more custom extensions (e.g., specified in 212 and/or received in 312). A communication party receiving this request may choose to support or not support this extension. This example line requests a WebSocket extension named "x-kaazing-channels" that, if supported, allows a plurality of channels to be established for a WebSocket connection. Each channel may individually support its own extension. In some embodiments, a channel specific extension extends standard functionality of a communication channel of a WebSocket connection to support new functionality not implemented by the WebSocket standard and/or the WebSocket channel enabling extension (e.g., extend functionality beyond channel functionality provided by "x-kaazing-channels" extension). A WebSocket extension may extend an entire WebSocket connection (e.g., cannot be applied individually to a channel), only communication channels of a WebSocket (e.g., channel specific extension), or either/both the entire WebSocket connection and its channels (e.g., extension may be specified as a WebSocket connection extension or as a channel specific extension in a parameter of an "x-kaazing-channels" extension). The "extensions=" parameter of this example requests possible support of two channel specific extensions identified as "x-kaazing-fanout" and "x-kaazing-encryption." This list of channel extensions is a superset of all possible extensions supported for all potential communication channels of the connection. A recipient of the request of this example line may choose to support any number of channel specific extensions identified in the parameter. Once a channel specific extension is supported, each channel specific extension can be selectively turned on or off for each channel when the channel is created.

Because the WebSocket protocol enables another subprotocol (e.g., application level protocol such as AMQP identified in a WebSocket connection request) to be communicated over the WebSocket protocol, the WebSocket protocol layer allows network delivery optimizations to be implemented without affecting the subprotocol of the WebSocket connection and allowing data to flow without alternating the encoding of the subprotocol.

At 504, a confirmation that communication channels may be established within the connection is provided. In some embodiments, the confirmation is received as at least a portion of the response received in 206 and/or received during the negotiation in 212 of FIG. 2. In some embodiments, the request is included in the response sent at 310 and/or provided during the negotiation in 312 of FIG. 3. For example, the confirmation is included in a response that indicates a subject connection has been upgraded to a WebSocket connection or a response that indicates that the requested WebSocket extension to support communication channels is enabled for the subject connection.

In an example, the following line is included in the confirmation provided during negotiation of a WebSocket extension:
Sec-Web Socket-Extension: x-kaazing-channels; extensions=x-kaazing-fanout
This line may be specified in a received response to a request to upgrade a network connection to a WebSocket connection (e.g., provided in 310 and/or received in 206) or received in a response during negotiation of one or more custom extensions (e.g., provided in 312 and/or received in 212). For example, a communication party that received the request from 502 is provided the response that the communication channel extension is supported. This example line confirms that a WebSocket extension named "x-kaazing-channels" is supported and enabled on the WebSocket connection utilized to provide the response. The "extensions=" parameter of this example confirms support of a channel specific extension identified as "x-kaazing-fanout." This list of channel extensions may specify any number of a superset of all channel specific extensions supported for all possible communication channels of the connection. The "x-kaazing-fanout" extension may be now selectively enabled or disabled when each communication channel is created within the connection. Other channel specific extensions may have been requested to be supported (e.g., "x-kaazing-encryption") during the "x-kaazing-channels" extension negotiation but the recipient of the request has not chosen to support other requested extensions.

At 506, data is communicated using the connection that supports one or more communication channels. In some embodiments, communicating the data via the connection includes inserting and/or removing a communication channel identifier in a data message. In some embodiments, at least a portion of each WebSocket message communicated via the network connection is reserved to include a communication channel identifier. For example, the first two bytes of the payload portion of every WebSocket message indicates a channel identifier of the communication channel that the message belongs to. The end applications/processes of the connection (e.g., application 106 of FIG. 1 utilizing the subprotocol of the connection) may be unaware of the channel identifier because the channel identifier is inserted by a Web Socket layer before data is communicated via the network connection and removed by a WebSocket layer of the data recipient before the data is provided to an end application/process.

In some embodiments, once multiple communication channels are supported for a WebSocket connection, one or more channels are automatically created for the WebSocket connection. One such automatically established channel is a default channel. The default channel may be identified by a binary hexadecimal number channel identifier 0x0000. All content sent via the WebSocket connection may be identified as sent via the default channel unless otherwise indicated to be sent using a different channel identifier. For example, in a WebSocket connection that supports multiple communication channels but has established only one communication channel, all content is sent via the default communication channel by being labeled with channel identifier 0x0000.

Another automatically established channel may be a control message channel. The control message channel may be identified by a binary hexadecimal number channel identifier 0xffff. Content provided via the control message channel is not delivered to an end application/service and is instead utilized by intermediaries (e.g., WebSocket layer) to send and receive commands, metadata, and/or WebSocket protocol/extension messages. For example, a command and related notifications may be provided for channel creation, destruction, migration, merging and/or unmerging on the control message channel. In some embodiments, two or more communication channels may be merged. For example, when two communication channels are merged, any communication provided to one communication channel of linked communication channels is handled by a receiver of the communication as having been received on each of the linked communication channels. By merging communication channels, duplicated data to be sent via each of the merged communication channels only needs to be sent once in any of the merged communication channels and the receiver of the communication treats the data as having been received on every one of the merged communication channels. In some embodiments, one channel may be migrated to another channel. The merging and migration of channels may require that all channels involved in the migration or merge were created by the same communication party. For example, all channels created by one side of the WebSocket connection must be identified by an even numbered channel identifier and all channels created by the other side of the WebSocket connection must be identified by an odd numbered channel identifier. In this example, an odd number identifier channel may be only merged or migrated with another odd number identifier channel and an even number identifier channel may be only merged or migrated with another even number identifier channel.

In some embodiments, when a communication channel is modified (e.g., created, destroyed, migrated, or merged), a notification is provided via the control channel. For example, when a channel is created, the following message may be provided on a control channel identified by identifier 0xffff (i.e., first bytes of the payload of the message indicates that the message is provided on the control channel identified as 0xffff).

0xffff channel 0002 created w/ extension x,y
The above message indicates that a new communication channel identified by identifier 0x0002 has been created that supports channel specific extensions "x" and "y" (e.g., requested in 502 and confirmed in 504). In another example, when a channel is migrated, the following message may be provided on a control channel identified by identifier 0xffff.

0xffff channel 0002 migrated to 0004
The above message indicates that the data stream labeled as channel identifier 0x0002 will now be migrated and labeled as channel identifier 0x0004. In another example, when a channel is destroyed, the following message may be provided on a control channel identified by identifier 0xffff.

0xffff channel 0004 destroyed
The above message indicates that the channel identified with identifier 0x0004 is destroyed and not utilized.

Figure 6:
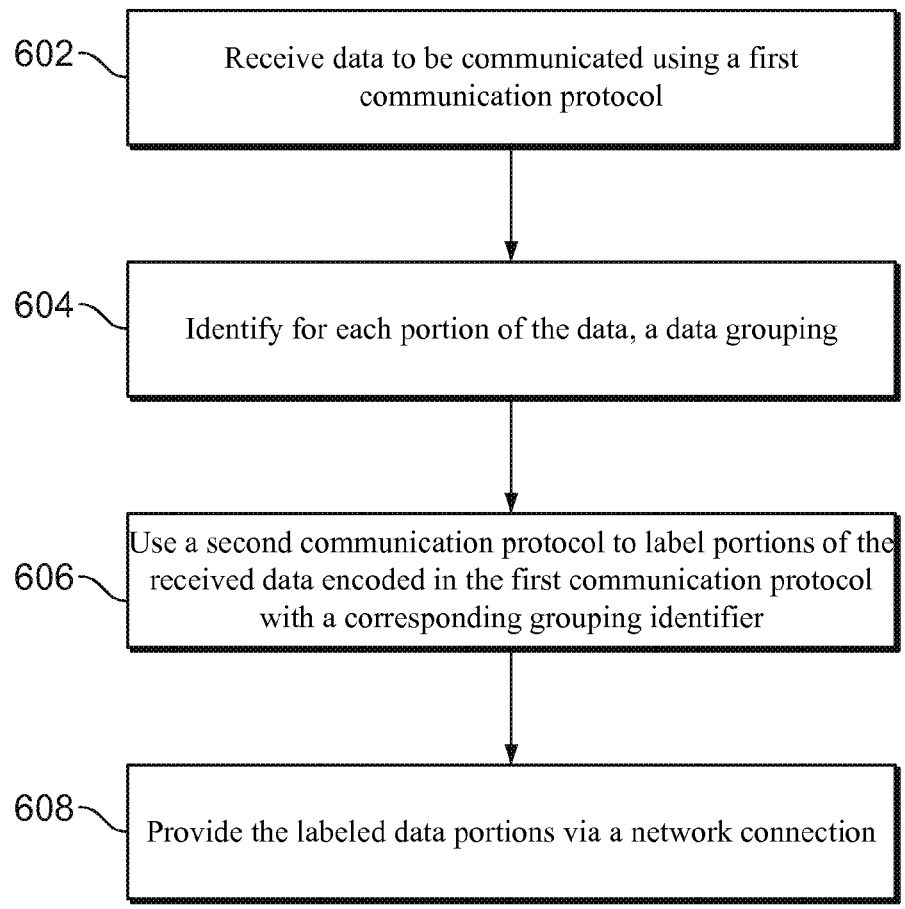
FIG. 6 is a flowchart illustrating an embodiment of a process for labeling data.

FIG. 6 is a flowchart illustrating an embodiment of a process for labeling data. The process of FIG. 6 may be implemented on a device enabling communication channels within a network connection. In some embodiments, at least a portion of the process of FIG. 6 is implemented on WebSocket edge gateway 111, WebSocket gateway 112, client 102, client 103, server 110, and/or server 114 of FIG. 1. In some embodiments, the process of FIG. 6 is included in 408 of FIG. 4 and/or 506 of FIG. 5.

At 602, data to be communicated using a first communication protocol is received. In some embodiments, the data includes data to be communicated via a WebSocket connection established using at least a portion of the processes of FIG. 2, 3, or 5. In some embodiments, the first communication protocol is an application level protocol. For example, the first communication protocol is the subprotocol communicated over a WebSocket connection (e.g., specified in 204 or 212 of FIG. 2 and confirmed in 310 or 312 of FIG. 3). In some embodiments, the data is received from a client application (e.g., application 106/107 of FIG. 1), a server application (e.g., application of server 110/114), a server (e.g., received at WebSocket gateway 112 from server 110/114), and/or a client (e.g., received at WebSocket edge gateway 111 from client 102/103). In some embodiments, the data is received via a connection that does not support multiple communication channels and it is desired to provide the data using a connection that supports multiple communication channels.

At 604, for each portion of the data, a data grouping is identified. In some embodiments, the data grouping allows at least portions of the data to be grouped/labeled for separate processing. For example, one portion of the data may be optimized for more efficient content delivery while another portion is not optimized. In some embodiments, the data grouping is communication channels of a WebSocket connection (e.g., channels established using at least a portion of the process of FIG. 5). For example, identifying the data grouping includes identifying a communication channel. In some embodiments, identifying the data grouping includes analyzing one or more of the following to determine the data grouping for each data portion: a location address associated with the data portion, an IP address of the data portion source, an IP address of the data portion destination, a location associated with the data portion source, a location associated with the data portion destination, an identifier of the data portion source, an identifier of the data portion destination, an identifier of the data portion, and content of the data portion. For example, content is to be delivered from a content source to a plurality of different clients and data for each different client is grouped into a different communication channel (e.g., one channel per client) of a WebSocket connection between two WebSocket gateways (e.g., between gateway 111 and gateway 112 of FIG. 1). In some embodiments, a data portion without a specific data grouping may be identified as belonging to a default data grouping (e.g., channel 0x0000). An example of the data portion includes at least a portion of the data to be included in a single WebSocket message.

At 606, a second communication protocol is used to label portions of the received data encoded in the first communication protocol with a corresponding grouping identifier. In some embodiments, the grouping identifier is an identifier of the grouping identified in 604. For example, the first two bytes of the payload portion of every WebSocket message that is to contain the data portion indicates a channel identifier of the communication channel that the data portion belongs to. The grouping identifier may be a binary number indicating a specific WebSocket connection channel. Each data grouping is assigned a unique grouping identifier. In some embodiments, the grouping identifier identifies which communication party created the corresponding grouping. For example, all channels created by one communication party of the WebSocket connection must be identified by an even numbered channel identifier and all channels created by the other communication party of the WebSocket connection must be identified by an odd numbered channel identifier. In some embodiments, using the second communication protocol includes using a WebSocket protocol to encode data portions into WebSocket messages each labeled with a communication channel identifier. The data portions encoded in the first communication protocol may be labeled without affecting the encoding of the first communication protocol because the WebSocket protocol is able to transport a subprotocol over the WebSocket protocol and the labeling is achieved via the WebSocket layer without affecting its subprotocol layer.

At 608, the labeled data portions provided are via a network connection. The labeled data portions may be sent via a single WebSocket connection. In some embodiments, providing the labeled data portions includes sending the data portions via a WebSocket connection that supports the multiple communication channels (e.g., support extension established using at least a portion of the process of FIG. 5). For example, labeled WebSocket messages are provided via a WebSocket connection. In some embodiments, data transport optimization is performed using the labels before the labeled data portions are provided. The recipient of the labeled data portions may perform additional data transport optimizations using the labels.

FIG. 7 is an example communication exchange between two WebSocket communication parties using multiple communication channels of a WebSocket connection. The shown exchange may be between one or more of the following: WebSocket edge gateway 111, WebSocket gateway 112, client 102, client 103, server 110, and server 114 of FIG. 1. For example, FIG. 7 shows communication sent and received by client 102 to/from WebSocket edge gateway 111. In another example, FIG. 7 shows communication sent and received by WebSocket edge gateway 111 to/from WebSocket gateway 112.

The example of FIG. 7 is a simplified excerpt of an example exchange and does not show the complete communication exchange and required parameters. The non-indented lines of FIG. 7 show a communication sent by a first communication party to a second communication party and the indented lines show communication received by the first communication party from the second communication party. The example of FIG. 7 utilizes an application level subprotocol STOMP (Simple Text Oriented Message Protocol) communicated over a WebSocket protocol connection.

Lines 702 and 704 conform to the WebSocket standard for requesting a connection to be upgraded to a WebSocket connection. Line 706 requests a WebSocket extension named "x-kaazing-channels" that, if supported, allows a plurality of channels to be established for a WebSocket connection. Line 706 also specifies a parameter of the "x-kaazing-channels" requesting possible support of three communication channel specific extensions "x," "y," and "z." Lines 702, 704, and 706 may be received in 502 of FIG. 5 and/or specified in a request to upgrade a network connection to a WebSocket connection (e.g., specified in 204 and/or received in 304) or specified in a request to negotiate one or more custom extensions (e.g., specified in 212 and/or received in 312).

Indented lines 708, 710, and 712 are received in response to the request of lines 702, 704, and 706. Lines 708 and 710 conform to the WebSocket standard for receiving a confirmation that the connection is upgraded to a WebSocket connection. Line 712 confirms that a WebSocket extension named "x-kaazing-channels" is supported by the request receiving communication party and with additional support for channel specific extensions "x" and "y" but not "z." This line may be included in a confirmation received in 504 of FIG. 5 and/or in a received response received in response to upgrade a network connection to a WebSocket connection (e.g., provided in 310 and/or received in 206) or received in a response to negotiate one or more custom extensions (e.g., provided in 312 and/or received in 212). Now the WebSocket connection has been established with support for multiple communication channels. Two channels have been created automatically. One is the default communication channel identified by identifier 0x0000 and the other is a control channel identified by identifier 0xffff.

Line 714 shows a STOMP protocol connection message sent on default channel 0x0000 with the 0x0000 identifier included in the beginning of the payload of the WebSocket message including the contents of line 714. Line 716 is a STOMP protocol message confirming the connection is received with channel identifier 0x0000 in response to line 714.

Line 718 shows a STOMP protocol subscription message sent with channel identifier 0x0000 and Line 720 shows a STOMP protocol response confirming receipt of the message of line 718.

Line 722 shows a message received with the control channel identifier 0xffff indicating a message that a new channel identified as 0x0002 has been created with support for channel specific extension "y." The recipient of the line 718 message has created a new channel in response to the message to provide responsive subscription content via the new channel. Line 724 shows a STOMP protocol message content responsive to the subscription requested in line 718 received with an identifier of the newly created channel 0x0002. Line 726 shows a STOMP protocol confirmation message sent with channel identifier 0x0000 to confirm that the message of line 724 has been received. Line 728 shows a STOMP protocol confirmation message received to confirm that the confirmation of line 726 was received.

Line 730 shows a STOMP protocol unsubscribe message sent with channel identifier 0x0000 to unsubscribe the subscription request sent in line 718. Line 732 shows a STOMP protocol confirmation message received with channel identifier 0x0000 to confirm that the message of line 730 has been received. Line 734 shows a message received with the control channel identifier 0xffff indicating a message that the subscription associated channel identified as 0x0002 has been destroyed.

Figure 8:
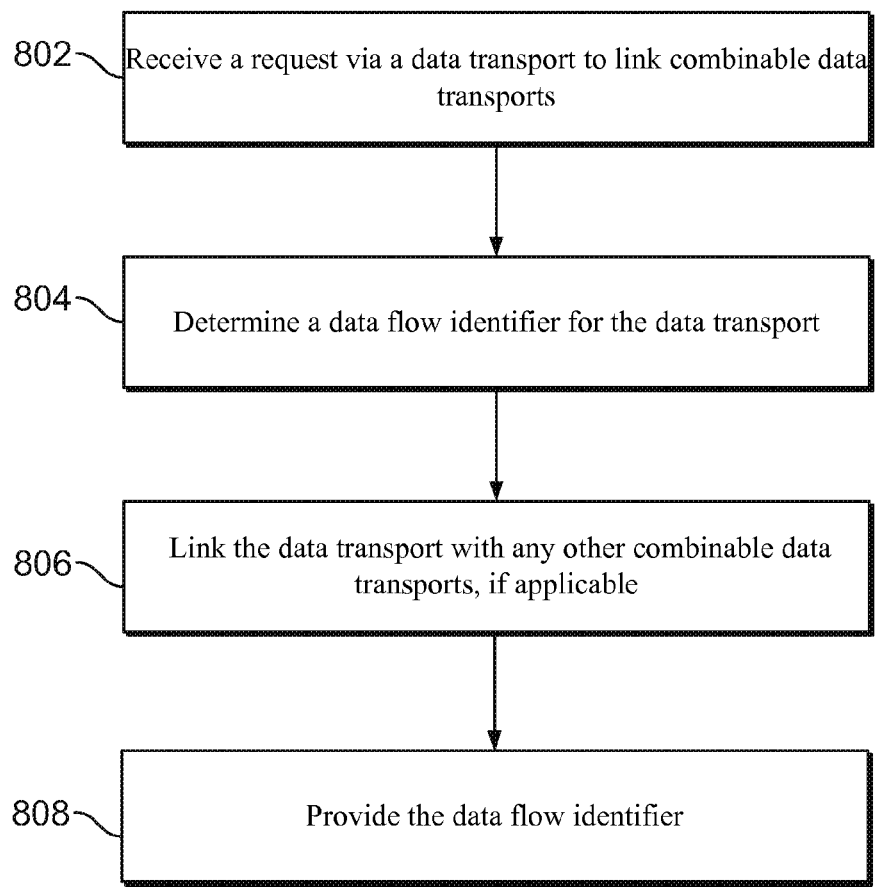
FIG. 8 is a flowchart illustrating an embodiment of a process for linking data flows together.

FIG. 8 is a flowchart illustrating an embodiment of a process for linking data flows together. In some embodiments, at least a portion of the process of FIG. 8 is implemented on WebSocket edge gateway 111, WebSocket gateway 112, server 110, and/or server 114 of FIG. 1.

For example, the process of FIG. 8 is implemented by WebSocket gateway 112. In this example, client 102 establishes a connection (e.g., WebSocket connection without multiple channel support) with WebSocket edge gateway 111 that in response establishes a connection with WebSocket gateway 112 requesting a WebSocket connection with support for multiple channels (e.g., to allow linking of connections between gateway 111 and gateway 112).

At 802, a request is received via a data transport to link combinable data transports. In some embodiments, the same two end points of a network communication may be transporting the same content in multiple parallel data transport streams. For example, two WebSocket connections between the same end points may be transporting the same duplicated content. It may be desirable to eliminate the duplicated transfer and send the content once. For example, client 102 and client 103 both desire to subscribe to the same content provided by server 114 of FIG. 1. In this example, client 102 and 103 both independently establish a connection with server 114 via WebSocket edge gateway 111 and WebSocket gateway 112. By independently establishing this flow, both client 102 and 103 may be independently authenticated by server 114 and/or gateway 112 to authorize the subscription. However, because they have subscribed to the same content using independent data transports, they will be provided the same content via different data transports. Although it was desirable to allow the subscription to flow inbound independently to allow independent authentication, authorization, and management at the end server, it is desirable to be able to combine a portion of the data flow back to the clients and send data once until it reaches gateway 111 where the received data can be duplicated and sent/broadcasted/fanned via independent data transports back to the clients.

Examples of the data transport include a network connection (e.g., a WebSocket connection) and a communication channel within a connection (e.g., a channel of a WebSocket connection that supports multiple communication channels).

In some embodiments, receiving the request includes receiving a request for a WebSocket connection. In some embodiments, the request is included in the request sent in 204 and/or an option negotiated in 212 of FIG. 2. In some embodiments, the request is included in the request received at 304 and/or an option negotiated in 312 of FIG. 3. For example, the request includes a request to upgrade an existing connection to a WebSocket connection that supports an extension to allow the WebSocket connection to be combined with another data transport (e.g., with another WebSocket connection or a channel of a WebSocket connection between the same two points).

In an example, the following line is included in a request to negotiate a WebSocket extension:

Sec-WebSocket-Extension: x-kaazing-fanout

This line may be specified in a request to upgrade a network connection to a WebSocket connection (e.g., specified in 204 and/or received in 304) or specified in a request to negotiate one or more custom extensions (e.g., specified in 212 and/or received in 312). A communication party receiving this request may choose to support or not support this extension. This example line requests a WebSocket extension named "x-kaazing-fanout" that, if supported, allows the WebSocket connection to be linked with another data transport.

In some embodiments, receiving the request includes receiving a request for a new communication channel of a WebSocket connection. For example, the request includes content that causes a new communication channel to be established for the WebSocket connection. In one example, a WebSocket connection has been established with support for an "x-kaazing-channels" extension described earlier that also supports a channel specific extension identified as "x-kaazing-fanout" supporting linking of data transports. The received request may request, directly or indirectly, a new channel to be established with support for the "x-kaazing-fanout" channel specific extension.

In some embodiments, the received request specifies an identifier that identifies other data transports that may be linked together. For example, the request includes an identifier of content transported by the data transport and this identifier may be matched with another identifier of another data transport to determine whether same data is being transported.

At 804, a data flow identifier for the data transport is determined. In some embodiments, determining the data flow identifier includes determining an identifier that uniquely identifies content to be transported via the data transport. For example, two different data transports that will be transporting the same duplicated data would be determined to have the same data flow identifier. In some embodiments, determining the data flow identifier includes analyzing one or more of the following: an existing data flow identifier, a location address associated with a content/service request, an IP address of the data transport endpoint, a location associated with the data transport endpoint, an identifier of the source of data to be communicated via the data transport, an identifier of the data transport endpoint, a user account, a subscription via the data transport, and content of data transported via the data transport. Data transports to be linked may be assigned the same data flow identifier.

At 806, the data transport is linked with any other combinable data transports, if applicable. For example, it is determined whether the data transport will be transporting duplicated data of another combinable data transport. In some embodiments, linking the data transport includes assigning the linked data transports the same data flow identifier. In some embodiments, linking the data transport includes sending only one copy of data to be duplicated and sent via all the linked data transports. For example, data that is supposed to be sent via each of the linked data transports is sent via only one (e.g., randomly selected, fastest connection, largest bandwidth, oldest connection, etc.) of the linked data transports (e.g., selected data transport may be dynamically changed to another one of the linked data transports if the one data transport goes down or reduces in performance). In some embodiments, only data transports with the same security scope may be linked. For example, by linking data transport together, security that compromises one data transport compromises all the linked data transports. Only data transports authenticated using the same authentication may be linked together (e g, linking allowed only between channels of a single WebSocket connection, linking allowed only between data transports of WebSocket connections communicated over the same physical data transport (logical WebSocket connections running over a muxing protocol of a signal physical connection)).

At 808, the data flow identifier is provided. In some embodiments, providing the data flow identifier includes providing the data flow identifier in a confirmation that a WebSocket connection that supports an extension to enable data transport linking has been established. In some embodiments, providing the data flow identifier includes providing the data flow identifier in a confirmation that a new channel of a WebSocket connection has been established and is supporting a channel specific extension to enable data transport linking. In some embodiments, the data flow identifier is provided in the response of 504 of FIG. 5 and/or provided in a response to upgrade a network connection to a WebSocket connection (e.g., provided in 310 and/or received in 206) or in a response to negotiate one or more custom extensions (e.g., provided in 312 and/or received in 212).

In some embodiments, a recipient of the data flow identifier determines whether any of its data transports are linked by tracking which of its data transports have been assigned the same data flow identifier. Thus if data is received on one data transport that is linked to other data transports (e.g., same data flow identifiers and same communication parities), the data should be treated as having been received in all the linked data transports. In some embodiments, the recipient of the data flow identifier is a WebSocket edge gateway (e.g., gateway 111 of FIG. 1) that relays data as an intermediary between clients (e.g., client 102/103) and a WebSocket gateway/server (e.g., gateway 112 or server 110/114). Each client has individually established a connection to the WebSocket edge gateway that establishes corresponding individual connections to the WebSocket gateway/server for each client connection. The data transports between WebSocket gateway/server to the WebSocket edge gateway may be linked whereas corresponding connections to the clients are not linked. When data is received on any of the linked data transports, the WebSocket edge gateway distributes the data to all the corresponding unlinked data transports to the clients.

In some embodiments, by enabling linking of individual channels of a WebSocket connection rather than requiring an entire Web Socket connection to be linked, fine grain linking and/or other data transport optimizations may be performed. In some embodiments, rather than utilizing WebSocket channels, filters may be utilized to allow linking based on portions of content of a WebSocket connection. For example, a superset of data to be delivered to different clients may be received via a single data transport rather than individual data transports for each client, and an intermediary gateway (e.g., edge gateway 111 of FIG. 1) applies filters specific to each individual client to deliver relevant portions of the superset data to appropriate clients.

Although the examples above discuss upgrading an existing HTTP/HTTPS to a WebSocket connection, in some embodiments, another type of connection such as a stream of a SPDY protocol connection is requested to be upgraded to a WebSocket connection. In various embodiments, other protocol such as SPDY may be utilized with (e.g., underlying) an established WebSocket connection.

Although the examples above discuss upgrading an existing HTTP/HTTPS connection to a WebSocket connection, in some embodiments, a protocol other than the WebSocket protocol may be used. For example, another protocol that changes an HTTP/HTTPS connection to a bi-directional, full-duplex communication channel may be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for labeling data, comprising:
a processor configured to:
receive data to be communicated using a first communication protocol;
identify for each of a plurality of portions of the received data, a data grouping among a plurality of data groupings of a network connection;
use a second communication protocol to label identified portions of the received data encoded in the first communication protocol with a corresponding data grouping identifier; and
determine whether to link one of the plurality of data groupings of the network connection with a second data grouping, wherein determining whether to link the data groupings includes determining whether at least a portion of data to be communicated using the one of the plurality of data groupings of the network connection is a duplicate of data to be communicated using the second data grouping; and
a communication interfaced coupled with the processor and configured to provide via the network connection the labeled identified portions of the data.

2. The system of claim 1, wherein the first communication protocol is an application level protocol.

3. The system of claim 1, wherein the second communication protocol is a Web Socket protocol.

4. The system of claim 1, wherein the first communication protocol is communicated over the second communication protocol.

5. The system of claim 1, wherein identifying the data grouping includes identifying a communication channel among a plurality of communication channels of the network connection.

6. The system of claim 1, wherein the network connection is a Web Socket connection negotiated to support an extension that enables the network connection to support a plurality of communication channels corresponding to the plurality of data groupings.

7. The system of claim 1, wherein the received data was received via another network connection with a server.

8. The system of claim 1, wherein labeling the identified portions does not alter the first communication protocol encoding of the identified portions.

9. The system of claim 1, wherein identifying the data grouping includes analyzing one or more of the following associated with the corresponding identified portions of the received data: a location address, an end destination, a data source, and included contents.

10. The system of claim 1, wherein labeling the identified portions of the received data includes, for each identified portion, inserting the corresponding data grouping identifier in a payload portion of a corresponding WebSocket protocol message.

11. The system of claim 1, wherein the processor is further configured to process at least one of the identified portions of the received data using a Web Socket extension enabled for a corresponding identified data grouping.

12. The system of claim 1, wherein the second data grouping is another one of the plurality of data groupings of the network connection.

13. The system of claim 1, wherein the second data grouping is a data grouping of another network connection.

14. The system of claim 1, wherein the processor is further configured to determine whether to link one of the plurality of data groupings of the network connection with a second network connection.

15. The system of claim 14, wherein the one of the plurality of data groupings of the network connection shares a same network security scope with the second network connection.

16. The system of claim 1, wherein a recipient of the labeled identified portions of the received data broadcasts at least one of the labeled identified portions via a plurality of network connections of the recipient identified using the corresponding data grouping identifier of the one of the labeled identified portions of the received data.

17. A method for labeling data, comprising:
receiving data to be communicated using a first communication protocol;
using a processor to identify for each of a plurality of portions of the received data, a data grouping among a plurality of data groupings of a network connection;
using a second communication protocol to label identified portions of the received data encoded in the first communication protocol with a corresponding data grouping identifier;
determining whether to link one of the plurality of data groupings of the network connection with a second data grouping, wherein determining whether to link the data groupings includes determining whether at least a portion of data to be communicated using the one of the plurality of data groupings of the network connection is a duplicate of data to be communicated using the second data grouping; and
providing via the network connection the labeled identified portions of the data.

18. The method of claim 17, wherein the second communication protocol is a Web Socket protocol.

19. The method of claim 17, wherein the first communication protocol is communicated over the second communication protocol.

20. A computer program product for labeling data, the computer program product being embodied in a tangible computer readable storage medium and comprising computer instructions for:
receiving data to be communicated using a first communication protocol;
identifying for each of a plurality of portions of the received data, a data grouping among a plurality of data groupings of a network connection;
using a second communication protocol to label identified portions of the received data encoded in the first communication protocol with a corresponding data grouping identifier;
determining whether to link one of the plurality of data groupings of the network connection with a second data grouping, wherein determining whether to link the data groupings includes determining whether at least a portion of data to be communicated using the one of the plurality of data groupings of the network connection is a duplicate of data to be communicated using the second data grouping; and
providing via the network connection the labeled identified portions of the data.

* * * * *